Nov. 29, 1949 C. W. PRAEGER ET AL Re. 23,178

TOTE BOX HAVING INTEGRAL HANDLES

Original Filed Oct. 22, 1946 9 Sheets-Sheet 1

Inventors
CHARLES W. PRAEGER
HERMAN BLUM
HERMAN JOCHIMSEN

By B P Schlumme
Attorney

Nov. 29, 1949 C. W. PRAEGER ET AL Re. 23,178

TOTE BOX HAVING INTEGRAL HANDLES

Original Filed Oct. 22, 1946 9 Sheets-Sheet 2

Inventors

CHARLES W. PRAEGER
HERMAN BLUM
HERMAN JOCHIMSEN

By B. P. Whelan Attorney

TOTE BOX HAVING INTEGRAL HANDLES

Original Filed Oct. 22, 1946 9 Sheets-Sheet 3

Inventors
CHARLES W. PRAEGER
HERMAN BLUM
HERMAN JOCHIMSEN

By

B O Whelan Attorney

TOTE BOX HAVING INTEGRAL HANDLES

Original Filed Oct. 22, 1946 9 Sheets-Sheet 4

Inventors
CHARLES W. PRAEGER
HERMAN BLUM
HERMAN JOCHIMSEN
By
Attorney

TOTE BOX HAVING INTEGRAL HANDLES

Original Filed Oct. 22, 1946 9 Sheets-Sheet 5

Inventor
CHARLES W. PRAEGER
HERMAN BLUM
HERMAN JOCHIMSEN

By B. O. Yelle Attorney

TOTE BOX HAVING INTEGRAL HANDLES

Original Filed Oct. 22, 1946 9 Sheets-Sheet 6

Inventors
CHARLES W. PRAEGER
HERMAN BLUM
HERMAN JOCHIMSEN
By
Attorney

TOTE BOX HAVING INTEGRAL HANDLES

Original Filed Oct. 22, 1946 9 Sheets-Sheet 7

Inventors
CHARLES W. PRAEGER
HERMAN BLUM
HERMAN JOCHIMSEN
By
B. P. Miller
Attorney Nov. 29, 1949 C. W. PRAEGER ET AL Re. 23,178

TOTE BOX HAVING INTEGRAL HANDLES

Original Filed Oct. 22, 1946 9 Sheets-Sheet 8

Inventors

CHARLES W. PRAEGER
HERMAN BLUM
HERMAN JOCHIMSEN

By

Attorney

TOTE BOX HAVING INTEGRAL HANDLES

Original Filed Oct. 22, 1946 9 Sheets-Sheet 9

Inventors
CHARLES W. PRAEGER
HERMAN BLUM
HERMAN JOCHIMSEN
By B P Fehlner
Attorney Reissued Nov. 29, 1949

Re. 23,178

UNITED STATES PATENT OFFICE 23,178

TOTE BOX HAVING INTEGRAL HANDLES

Charles W. Praeger, Woodhaven, Herman Blum, Forest Hills, and Herman Jochimsen, Brooklyn, N. Y., assignors to Sturdibilt Milk Box Corp., Brooklyn, N. Y., a corporation of New York Original No. 2,464,343, dated March 15, 1949, Serial No. 704,954, October 22, 1946. Application for reissue May 31, 1949, Serial No. 96,218

18 Claims. (Cl. 220—97)

The present invention relates to tote boxes and box structures, and more particularly to boxes of composite construction for holding milk containers, cartons, bottles and other packages.

An important object of the invention is to provide a box which is particularly well adapted for holding milk cartons, containers, bottles or other packages of substantially rectangular cross section, and which is designed to withstand the rough usage to which such boxes are ordinarily subjected.

A further object of the invention is to provide a box which will effectively protect the cartons, containers, bottles or the like, within the box from injury when the box is handled by case hooks, hand trucks or the hands.

A further object of the invention is to provide a composite box formed of wood and metal, and which is strong, rigid and relatively light, and which may be readily grasped in the hands, without the fingers coming into injurious contact with the cartons or containers within the box.

An ancillary object of the invention is to have a box of above mentioned character which has maximum strength with the use of a minimum of material in order to provide a box of substantial durability combined with lightness to facilitate easy handling of the same.

A further object of the invention is to provide a box of the above mentioned character which is free from sharp edges which would readily cut or injure the user.

A further object of the invention is to provide a box of the above mentioned character having proper drainage, and which will properly nest when stacked with companion boxes.

A further object of the invention is to provide a box of the above mentioned character having wooden sides and metal ends, secured together so that the ends cannot be pulled from the wooden sides.

A further object of the invention is to provide a handle construction for the box which strengthens the box and renders it rigid.

Other objects and advantages of the invention will be apparent during the course of the following description.

In the accompanying drawings forming a part of this application, and in which like numerals are employed to designate like parts throughout the same, Figure 1*a* is a perspective view of a box embodying the invention.

Figure 6:
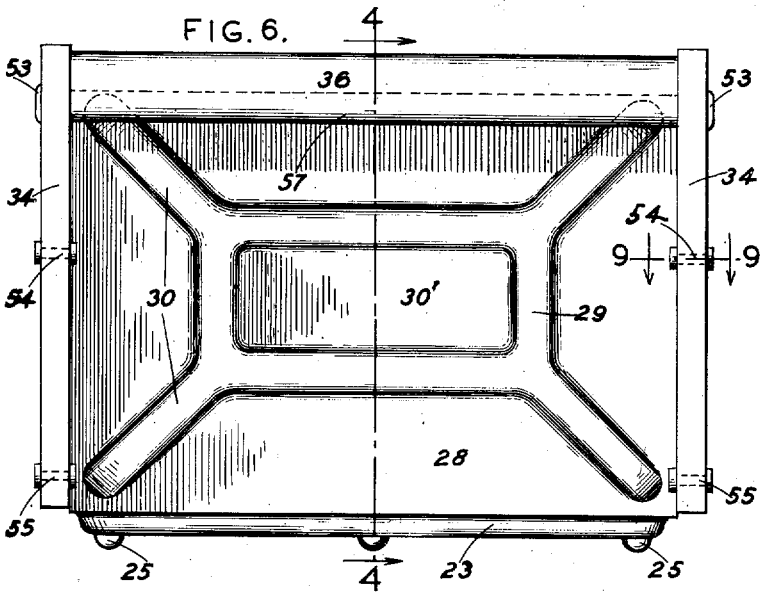
Figure 6 is an end elevation of the box.
Figure 9:
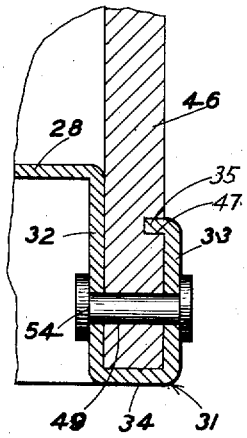
Figure 8:
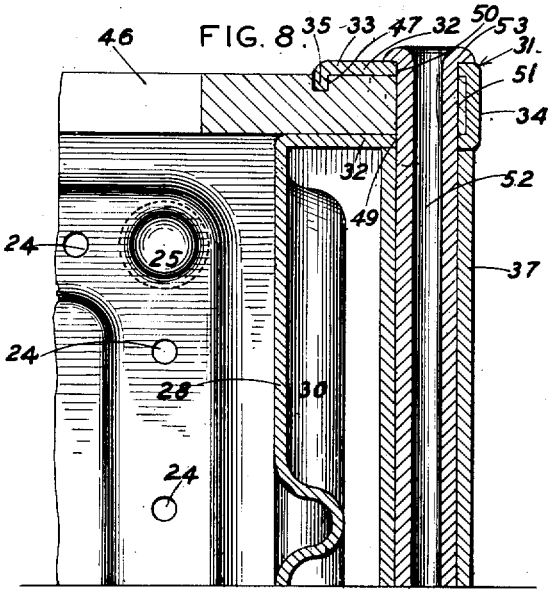
Figure 7:
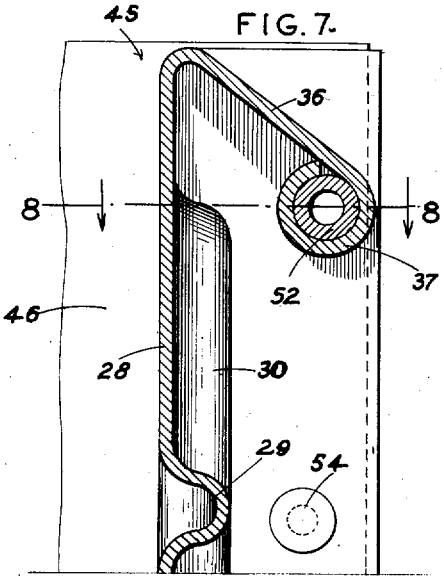
Figure 26:
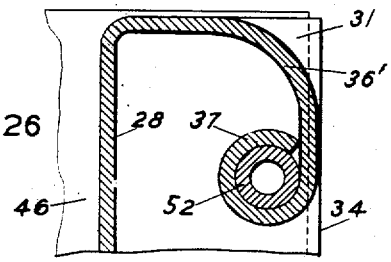
Figure 12:
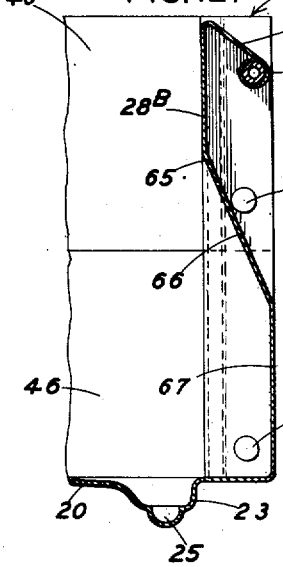
Figure 10:
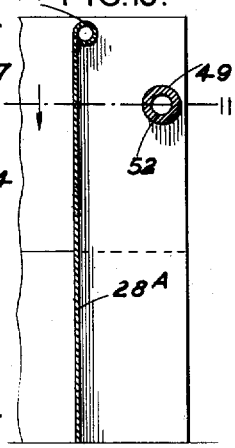
Figure 13:
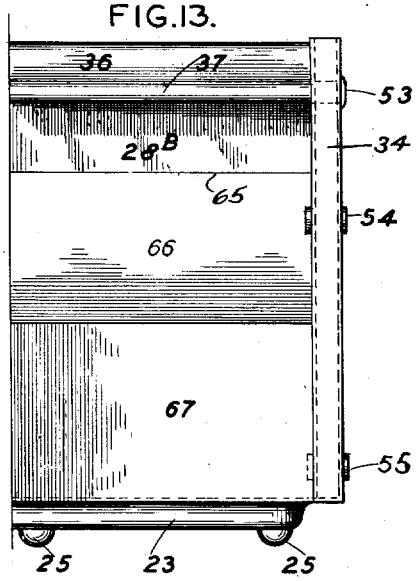
Figure 14:
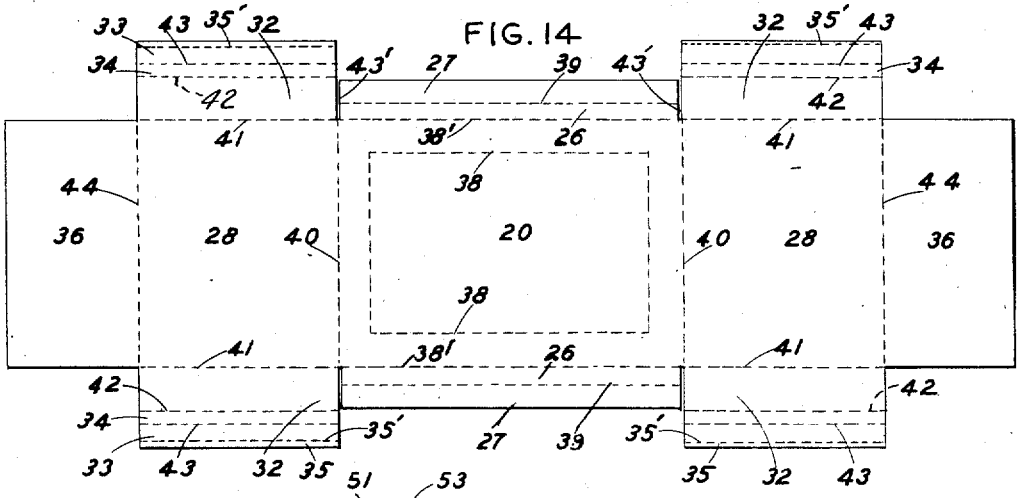
Figure 11:
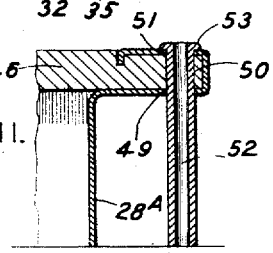
Figure 15:
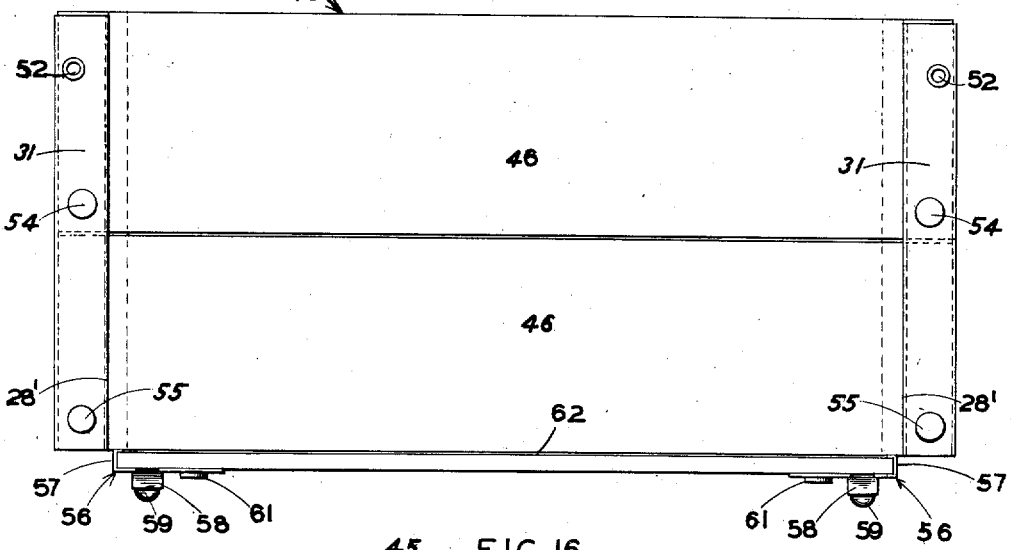
Figure 16:
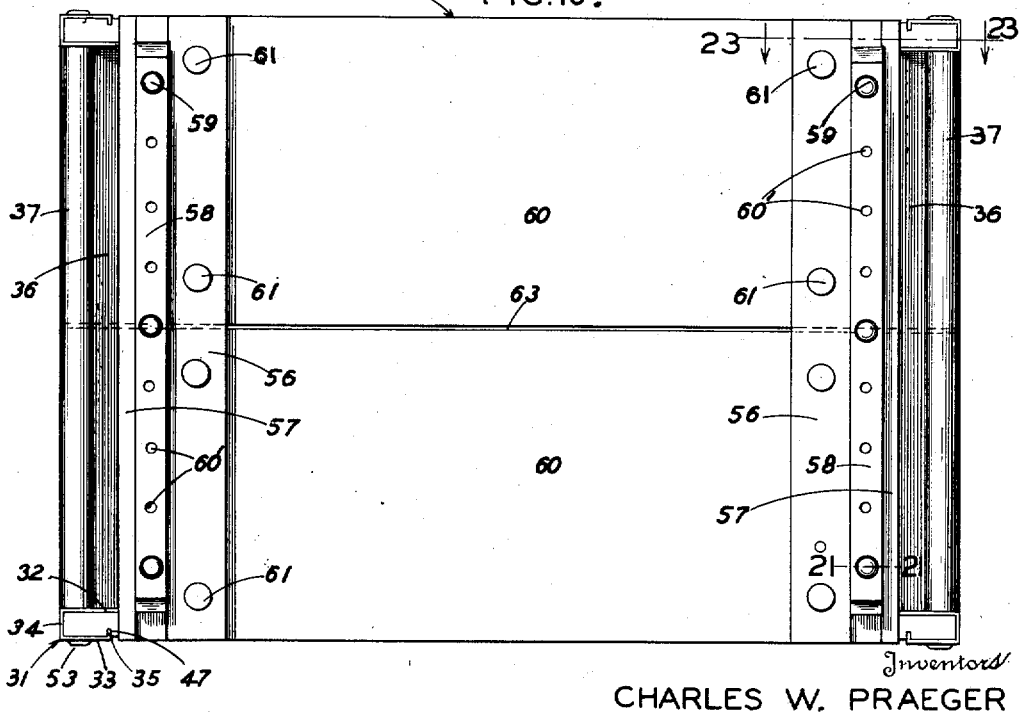
Figure 17:
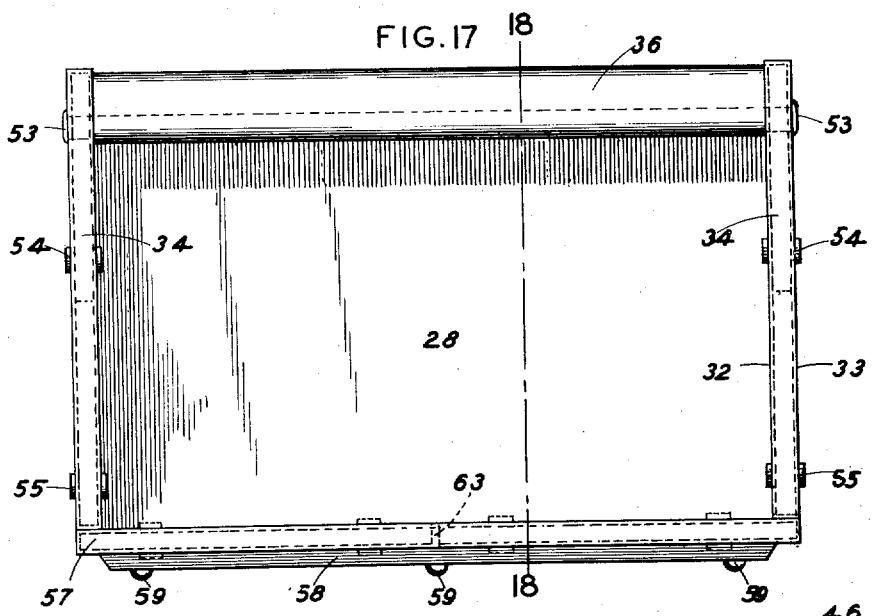
Figure 21:
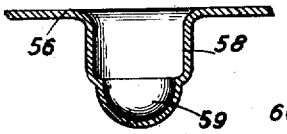
Figure 25:
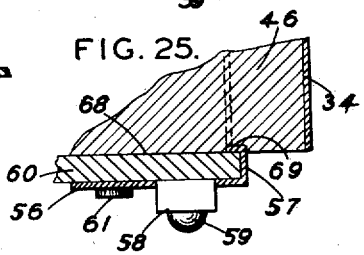
Figure 22:
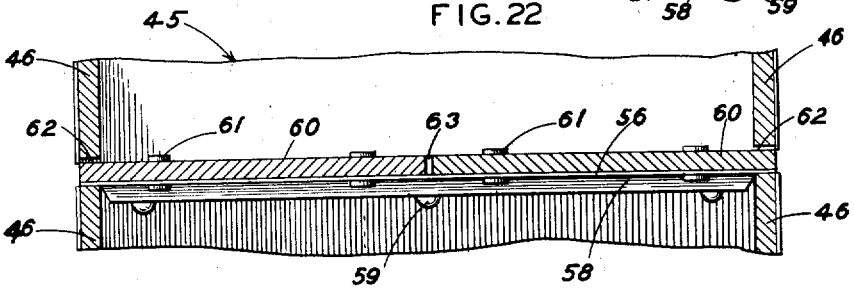
Figure 24:
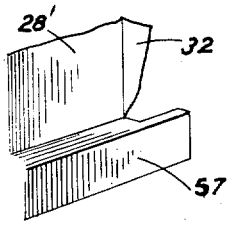
Figure 23:
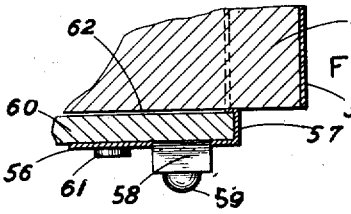
Figure 18:
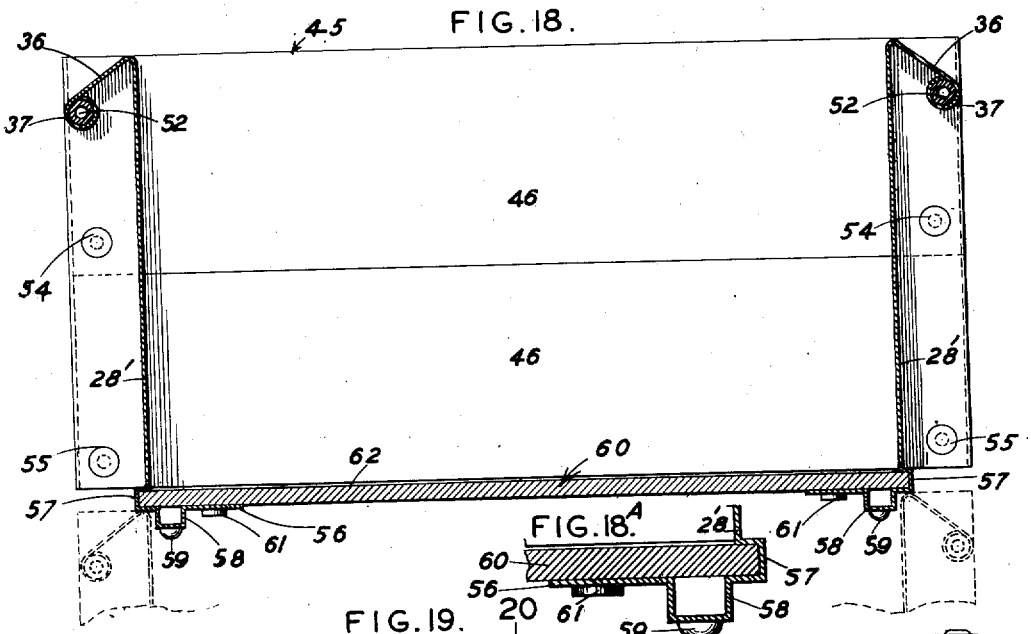
Figure 18A:
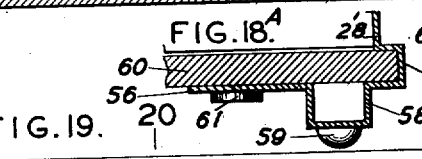
Figure 19:
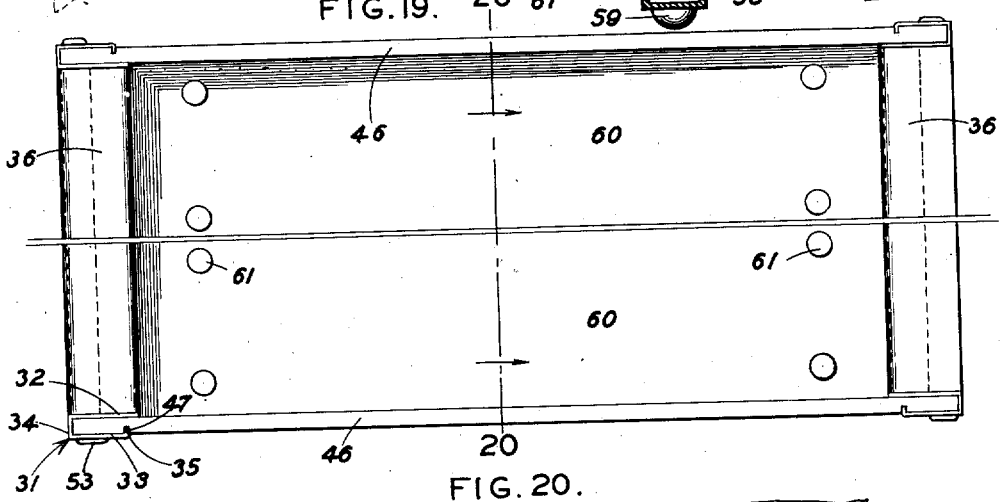
Figure 20:
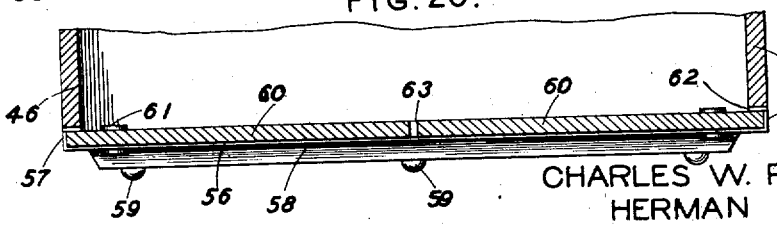

Figure 7 is an enlarged fragmentary longitudinal section taken on the line 4—4 of Figure 6, Figure 8 is an enlarged horizontal section taken on line 8—8 of Figure 7, parts being broken away, Figure 9 is an enlarged section taken on line 9—9 of Figure 6, Figure 10 is a central vertical longitudinal section through a modification of the invention, parts being broken away, Figure 11 is a horizontal section taken on line 11—11 of Figure 10, Figure 12 is a central vertical longitudinal section through a further modified form of the invention, parts being broken away, Figure 13 is an end elevation of the same, parts being broken away, Figure 14 is a plan view of a sheet metal blank, Figure 15 is a side elevation of a further modification of the invention, Figure 16 is a plan view of the same, Figure 17 is an end elevation of same, Figure 18 is a longitudinal section, taken on line 18—18 of Figure 17, Figure 18*a* is an enlarged vertical section taken on line 18—18 of Figure 17, parts being broken away, Figure 19 is a plan view of the box of Figure 15, Figure 20 is a transverse section taken on line 20—20 of Figure 19, Figure 21 is a section taken on line 21—21 of Figure 16, Figure 22 is a central vertical section taken through two boxes shown in Figure 15, showing the boxes in nested relation, parts being broken away, Figure 23 is a vertical section taken on line 23—23 of Figure 16, parts being broken away, Figure 24 is a fragmentary perspective view of one end of the box of Figure 15, Figure 25 is a vertical section, similar to Figure 23, showing a further slight modification, Figure 26 is a view similar to Figure 7, showing a modified form of handle.

Figure 27:
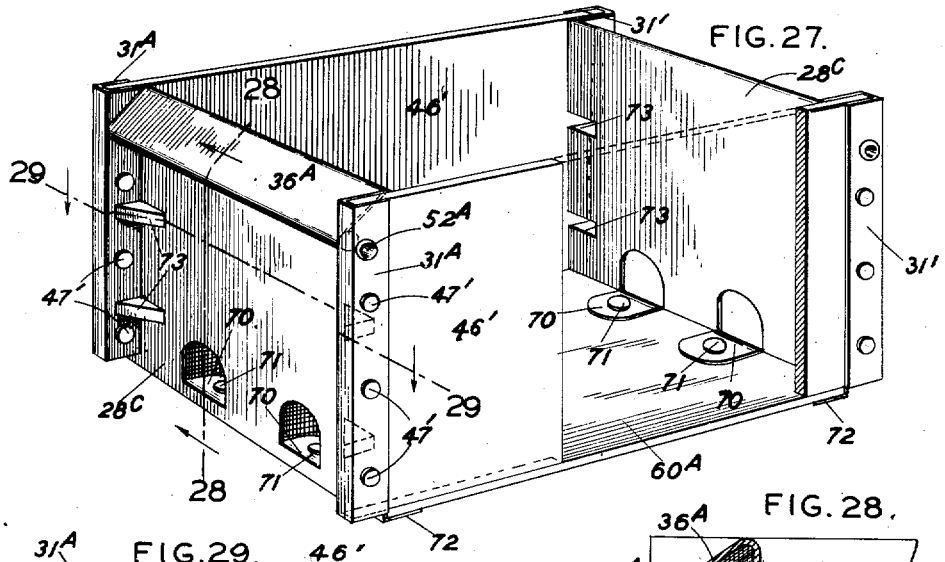
Figure 28:
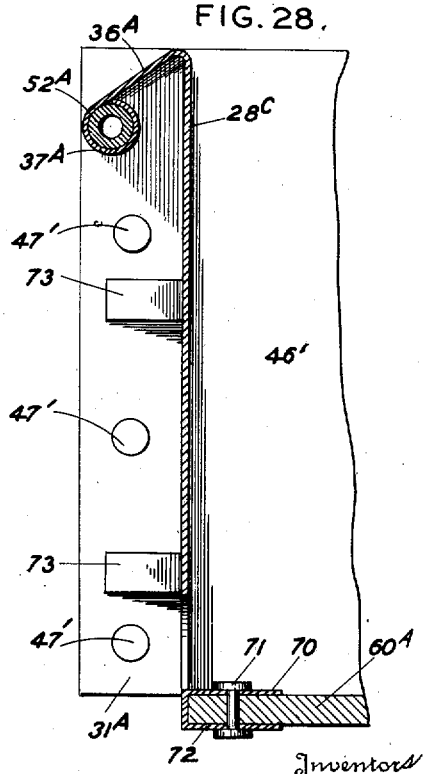
Figure 29:
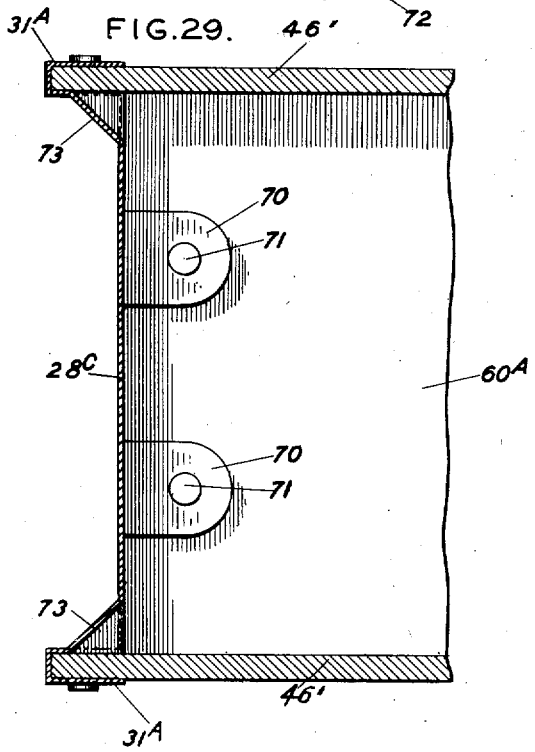

Figure 27 is a perspective view of a box embodying a further modification of the invention, parts being broken away, Figure 28 is a vertical section taken on line 28—28 of Figure 27, and, Figure 29 is a horizontal section taken on line 29—29 of Figure 27.

It is a well known fact that the trend of the dairy market has for some time been turning with increasing impetus toward universal use of paper or cardboard containers for milk and cream, these containers being generally of rectangular cross section. However, the means for safely and conveniently handling such containers have not kept pace with the popular adoption of the containers, so that an appreciable loss through damage of the latter is as yet considered unavoidable and therefore expected in the trade. In fact, the general and unlimited use of such milk containers is partly hampered and delayed for lack of proper facilities for safely handling the containers so that they will ultimately be delivered to the consumer intact and with full contents.

One weakness of the delivery cycle with respect to milk and cream containers is specifically that the boxes used heretofore have not been sufficiently strong to be durable nor designed to protect the containers effectively. Aside from the mentioned disadvantages remains the further serious and costly trouble of rapid deterioration of the boxes used, as they usually break apart in so short a time that their frequent replacement is an item of heavy expense with no remedy available on the market.

Having recognized the need for solving the very evident difficulties thus lying athwart the dairy business, we have now provided a box for holding milk containers of cardboard or paper, which will facilitate convenient and safe handling of such contianers without likelihood of the containers being injured or broken. If a carton or container should be injured or actually broken in the box, as is all too often the case in conventional boxes, loss of the product by leakage results. Even if injured or merely weakened in the box, the container is then in such condition that the subsequent handling of the same after removal from the box, may cause breakage of the container, principally by opening of the seams or joints near the bottom, whereby it will leak and thus lose the product.

One particular evil to which the milk boxes are exposed during transportation is a twisting action or distortion which conventional boxes are not rigid enough to withstand. Such distortion is especially harmful to milk containers, as they fit rather snugly in the boxes, which renders them subject to damage in that they are irresistibly caused to split open at the joints and seams, as already intimated.

Our box, by virtue of its special construction, features and mechanical design overcomes these disadvantages.

The box shown in Figures 1*a*, 1 to 9, and 14, comprises a metal bottom 20, having a centrally arranged raised portion 21 formed therein. This raised portion supports one or more of the milk containers, cartons, or bottles in raised position so that their tops project visibly above the other containers whereby they may be conveniently removed, rendering the subsequent removal of the remaining containers easy. This bottom 20 has inclined portions 22, extending downwardly in a longitudinal direction toward the opposite ends of the bottom. The bottom 20 has a downwardly projecting rib 23, which is rectangular and is arranged near the marginal edges of the bottom, and spaced inwardly therefrom. This rectangular rib stiffens the bottom and will fit into the open end of a companion box so that the boxes may be stacked. The rib 23 is provided with drain openings 24 and the rib 23 has depending hollow domes 25 formed thereon. The box slides upon these domes, in use, thus taking the wear off of the rib 23, and retaining the drain openings 24 uncovered. The bottom 20 has horizontal longitudinal extensions 26 and these horizontal extensions carry upstanding vertical longitudinal flanges 27.

Formed integral with the metal bottom 20 are metal ends 28, vertically arranged and disposed at right angles to the bottom. The ends of the rib 23 are spaced inwardly from the ends or end plates 28. Each end 28 is stiffened and reinforced by an outwardly bulging rib 29, which is rectangular, and carries outwardly bulging diagonal ribs 30 at its corners. The rectangular rib 29 affords a space 30' which may be used as a name plate or the like. At its vertical edges, each end 28 is formed into vertical channels or sockets 31. Each socket is generally U-shaped in horizontal cross section and includes a wide inner side 32, a narrow outer side 33 and an end 34. Each outer side 33 has its free end bent inwardly to provide a locking tongue 35, disposed at right angles thereto. The channels 31 are open at their tops and bottoms.

Each end is extended at its top and bent outwardly and downwardly, providing a wide inclined plate 36, the free end of which is rolled into a cylindrical sleeve 37, the outer face of which is substantially flush with the outer face of the end 34. The plate 36 and associated elements form a handle construction. The plate 36 covers the fingers, protecting them when the user passes the fingers beneath the handle construction, in lifting the box.

In Figure 14, is shown a sheet metal blank from which the bottom ends and associated elements are formed. In this figure, the bottom 20 is bent upon longitudinal lines 38 to form the inclined portions 22 and upon lines 38' to form the longitudinal extensions 26, and these extensions are bent upon lines 39 to form the flanges 27. The rib 23 is disposed between the lines 38 and 38'. The ends 28 are carried by the bottom 20 and are formed by bending the bottom upon the transverse lines 40. At their vertical edges, the ends 28 carry the channels 31, formed by bending the metal upon lines 41, 42, and 43, forming the inner sides 32, outer sides 33 and ends 34. The blank has transverse folding lines 35', providing the tongues 35. The blank has transverse slits 43' terminating at the line 38'. The channels 31 are separate from the extensions 26 and flanges 27. At their tops, the ends 28 are bent upon lines 44, to form the inclined wide plates 36, the free ends of which are rolled into the sleeves 37. These plates are separate from the channels 31, are arranged between them, and contact therewith.

Figure 1A:
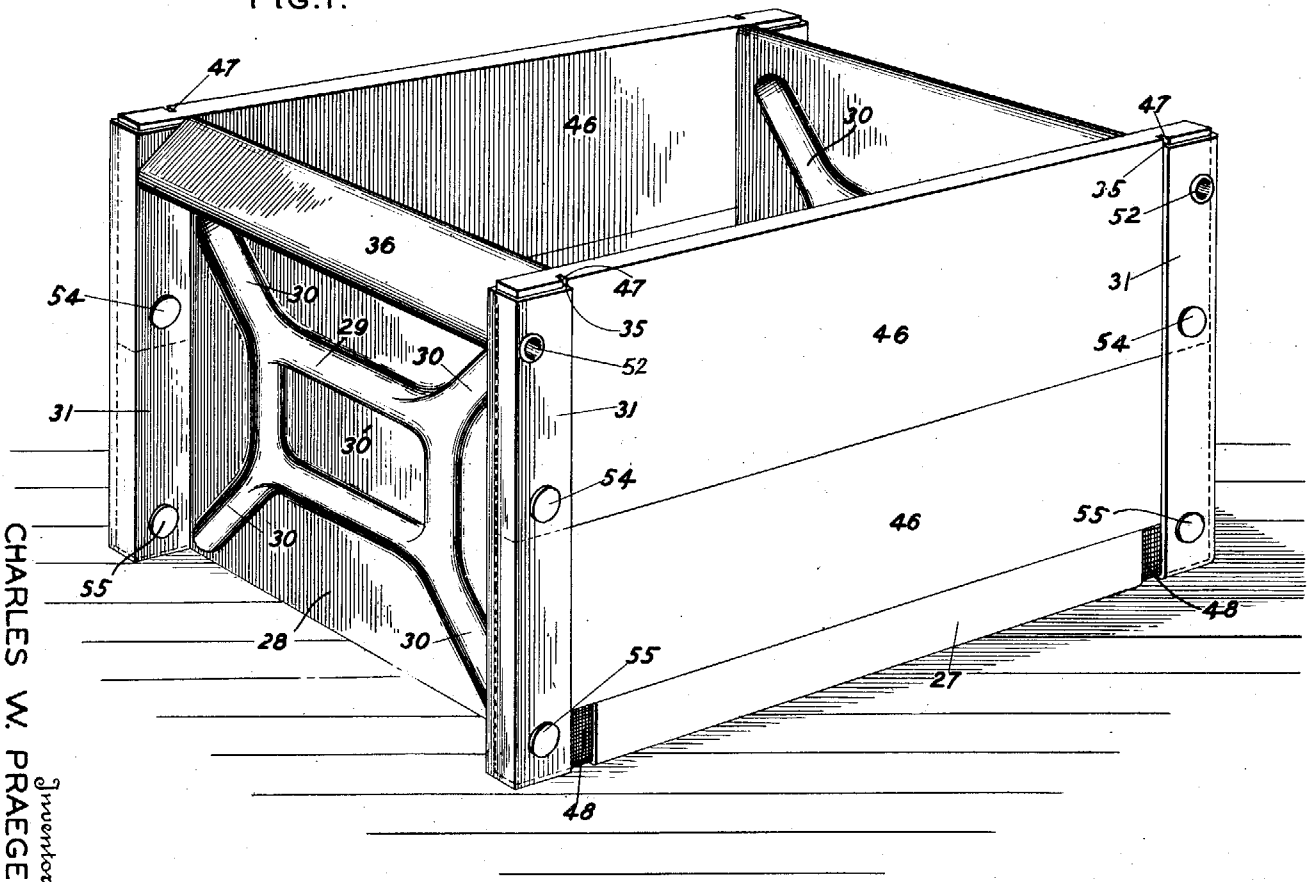
Figure 1 is a side elevation of the box embodying our invention.
Figure 1:
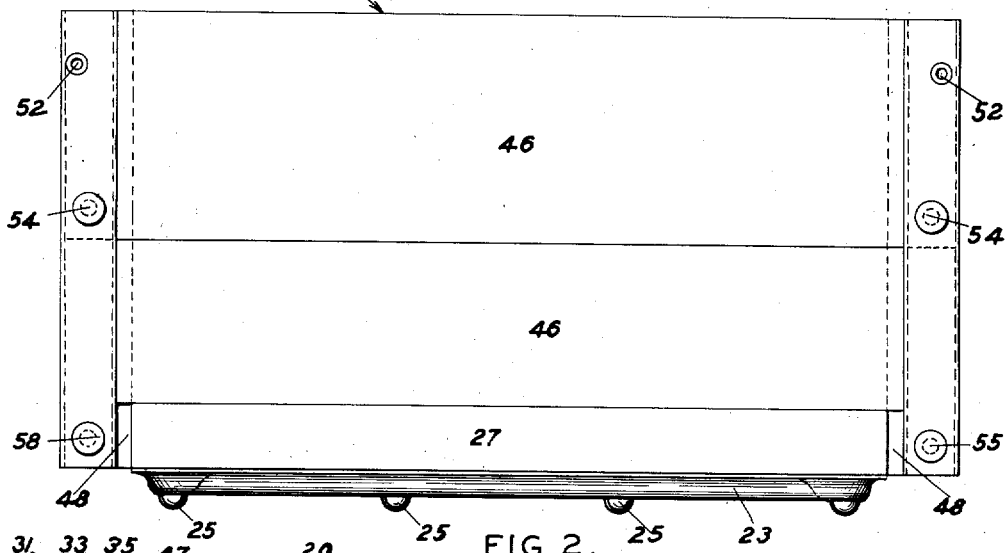
Figure 2:
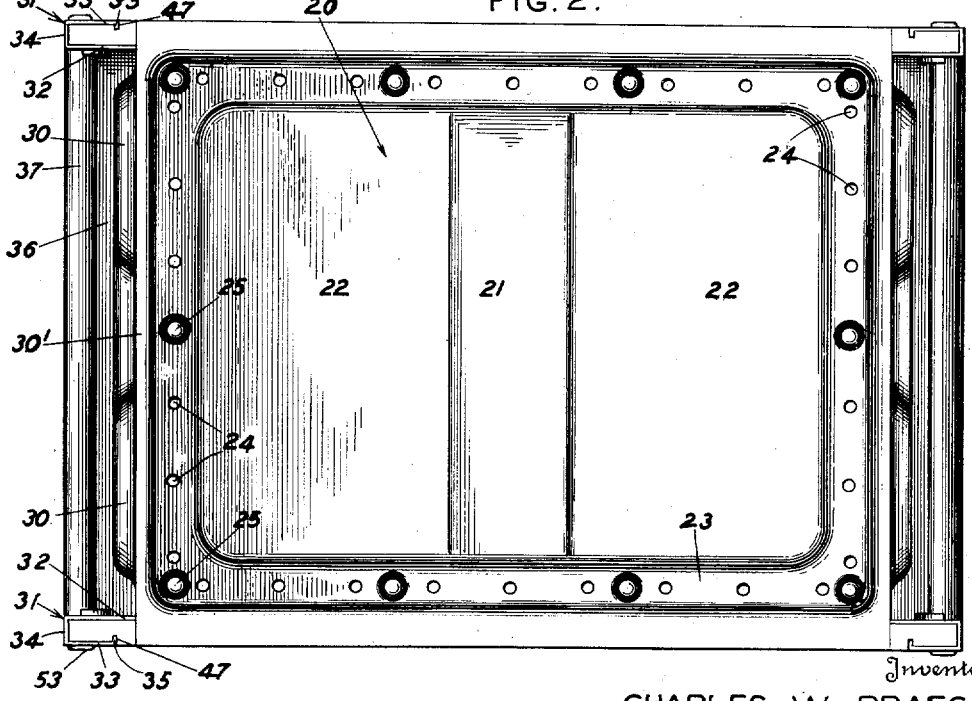
Figure 2 is a bottom plan view of the same.
Figure 4:
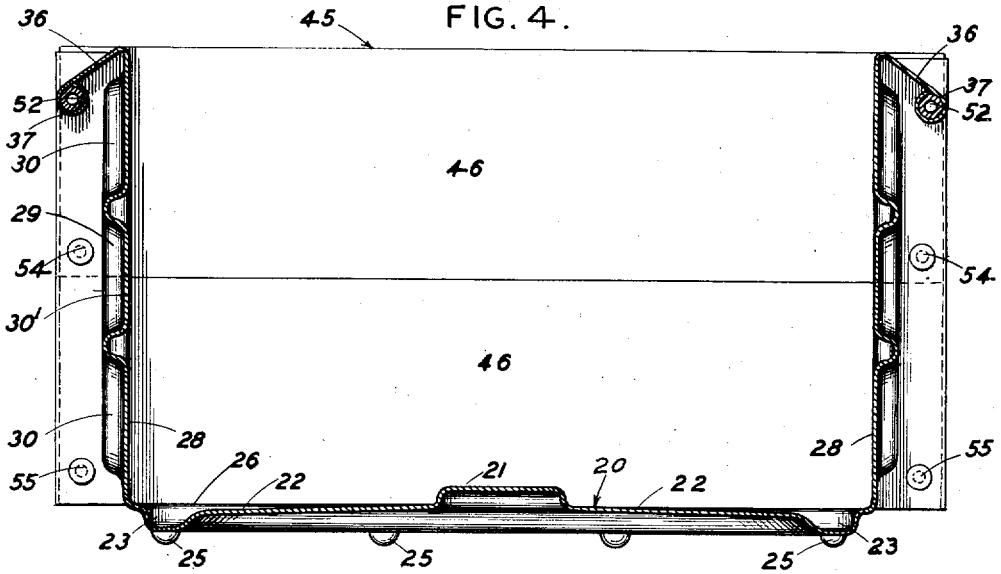
Figure 4 is a longitudinal section taken on line 4—4 of Figure 6.
Figure 3:
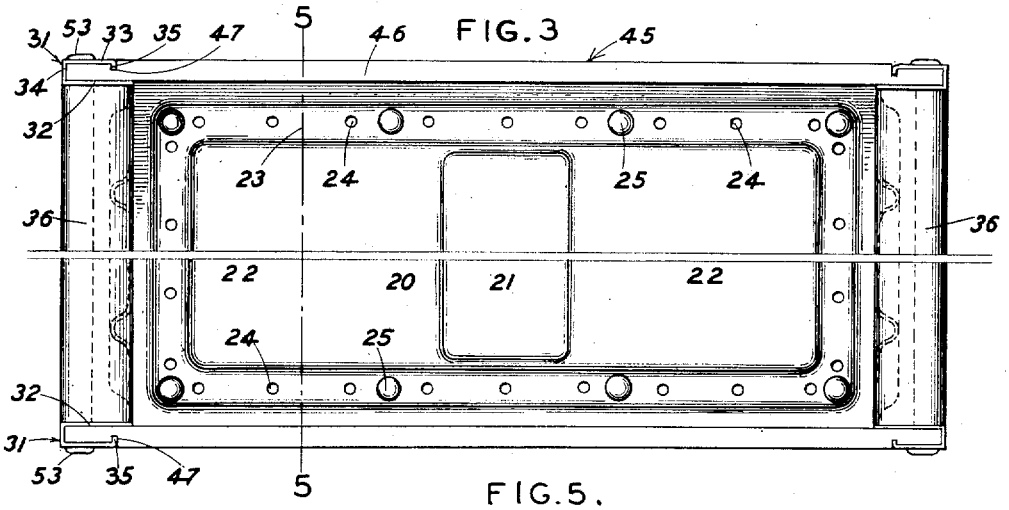
Figure 3 is a plan view of the box.
Figure 5:
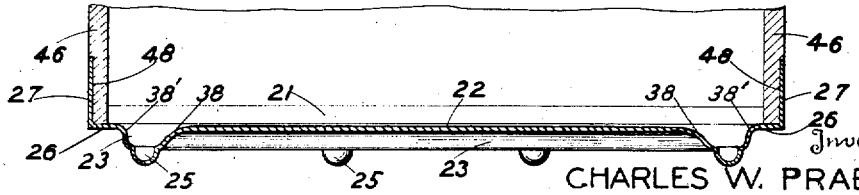
Figure 5 is a transverse section taken on line 5—5 of Figure 3.

The sides 45 of the box are formed of wood. This reduces the weight of the box and eliminates undue noise, in handling. Each side is preferably formed of two boards 46. These boards are provided near and inwardly of their opposite ends with vertical grooves 47, to snugly receive the locking tongues 35. The lower boards 46 are provided upon their outer faces and at their bottom edges with horizontal rabbets 48 to receive the flanges 27, and these flanges have their outer faces flush with the outer faces of the lower boards 46, as shown in Figure 5. Since the bottom 20 is rendered stiff or rigid by the rectangular rib 23 and the longitudinal extensions 26 are also rendered rigid by the inclination of the bottom 20, there is no tendency for the flanges 27 to spring out of the rabbets 48.

In assembling, the boards 46 are moved downwardly into the channels 31 through the upper ends of the channels, until the lower boards 46 rest upon the longitudinal extensions 26. The sides 32 and 33 have openings 49 and 50 formed therein, Figure 8, and openings 51 are also formed in the upper boards 46 near their ends. The tubes 52 or connecting elements are passed through these openings and the sleeves 37, and the ends of these tubes are spread, flattened or expanded, as shown at 53, to draw the sides 32 into clamping engagement with the ends of the sleeves 37 and wide plates 36 and thereby pinch the channels between the latter and tube ends 53. This is an important feature of the invention as it imparts stiffness or rigidity to the box. This feature provides handles of sufficient strength, to withstand the pull thereon when the boxes are stacked and the handle of the lowermost box is pulled for raising, tipping, or carrying the stacked boxes. Rivets 54 extend through the sides 32 and 33 and the upper boards 46, near their lower edges, and rivets 55 extend through the sides 32 and 33 and the lower boards 46 near their lower edges, in a similar manner to the rivets 54. The rivets 54 and 55 are arranged longitudinally inwardly of the tubes 52, so that they have a more secure connection with the upper and lower boards 46, Figure 9. These rivets securely lock the upper and lower boards to the channels so that these boards cannot have relative longitudinal movement. The tubes 52 and rivets 54 and 55 retain the tongues 35 within the grooves, and this tongue and groove connection securely holds the channels upon the ends of the boards 46. The upper edges of the boards 46 extend for a short distance above the tops of the channels, thus preventing the hands from readily contacting with such upper ends.

In Figure 26, is shown a slight modification of the handle construction. In this figure, the plate 36′, corresponding to the plate 36, is vertically curved and extends downwardly, as shown. The same sleeve 37 and connecting element or tube 52 is used. This curved plate 36′ and sleeve have clamping engagement with the sides of the channels 31. The elements 32 may be a solid rod instead of a tube. All other parts of the box remain identical with those before shown and described.

In the second form of the invention, shown in Figures 15 to 24, the metal bottom 20 is omitted. Formed integral with the lower edges of the ends 28′ are metal bottom sections 56, see more particularly Figure 18*a*. These metal bottom sections are provided at their outer edges with transverse inwardly facing channels 57, the outer ends of which extend beneath the sides 32 and 33 of the channels 31. The bottom sections 56 have downwardly projecting transverse horizontal stiffening ribs 58, terminating at their ends short of the ends of the bottom sections, Figure 16. These ribs 58 are also spaced longitudinally inwardly of the ends 28′. The ribs 58 have downwardly pressed sliding domes 59 and have drainage openings 60′.

The boards 46 constituting the sides 45 are held within the vertical channels 31 and are secured in place by the tubes 52 and rivets 54 and 55. The rabbets 48 may be omitted from the lower boards. The same handle constructions are provided comprising the plates 36 provided with the sleeves 37, and the plates and sleeves are clamped to the inner faces of the sides 32.

The bottom comprises boards 60, held within the horizontal channels 57 and secured thereto by rivets 61, passing through the inner ends of the bottom sections 56 and the boards 60. It is preferred to employ two rivets for each bottom board 60. The bottom boards have their outer longitudinal edges substantially flush with the outer faces of the lower side boards 46. The bottom side boards 46 are vertically spaced from the bottom boards 60 for affording drainage spaces 62 and the bottom boards have their inner edges spaced for providing a drainage space 63, Figures 16 and 22. The transverse ribs 58 are spaced inwardly sufficiently from the inner faces of the ends 28′, and their ends are spaced inwardly from the inner faces of the lower side boards 46 so that the ribs 58 may enter the upper end of a companion box, whereby the boxes may be stacked, Figure 22. All other parts of the box remain identical with those shown and described in connection with the first form of the invention.

As a further modification of the invention, Figures 10 and 11, metal ends 28A are substituted for the metal ends 28′ which are shown in Figures 15 to 18. The top edges of the ends 28A are rolled into beads 64. The tubes 52 are pased through the openings 49, 50, and 51, Figure 11, and serve to connect the channels 31. The sleeves 37 and plates 36 are omitted. All other parts of the ends 28A remain identical with the ends 28′ shown and described in Figures 15 to 24.

In Figures 12 and 13, we have shown a further modification of the invention. The numeral 28B designates metal ends, corresponding to the metal ends 28. The metal ends 28B are slit vertically as shown at 65, and the lower portions of the ends 28B are bent outwardly, forming an upper inclined portion 66 and lower vertical portions 67. The portions 66 and 67 are rigidly secured to the channels 31 by solder or the like. This affords sufficient finger space beneath the sleeves 37. All other parts of the ends and box remain identical with those shown and described in connection with the first form of the invention as shown in Figures 1 to 9.

In Figure 25, a slight modification of the box which is shown in Figure 23, is provided. In Figure 25, the lower side board 46 upon each side of the box contacts with the upper face of the bottom board 60. This is rendered possible by a notch 69 cut in the lower edge 68 of the bottom board 46. The side board 46 and bottom board 60 may be secured together by nails or the like, if desired.

A further modification of the box is shown in Figures 27 to 29. In these figures, the numeral 28C designates metal ends, provided at their vertical edges with vertical channels 31a, corresponding to the channels 31, Figure 1A. These channels 31a project outwardly beyond the outer faces of the ends 28C. These channels receive side boards 46', held therein by rivets 47'. The ends 28C are provided at their top edges with inclined plates 36a, corresponding to the plate 36, Figure 7, and the plates 36a are provided with sleeves 37a receiving tubes 52a, corresponding with the tubes 52. These tubes 52a clamp the inner sides of the channels 31' against the plate 36a and the sleeve 37a. The ends 28C do not have the horizontal channels 57, Figure 23. Each end continues straight to its lower edge, and has lugs 70 stamped therefrom and bent inwardly to assume a horizontal position and arranged upon the inner side of the end 28C. The lugs 70 engage the upper surface of a bottom board 60A, and rivets 71 pass through these lugs, the bottom board 60A and a bottom extension 72. This bottom extension is formed integral with the end 28C and is bent at right angles thereto and extends upon the inner face of the end 28C. Horizontal diagonal hollow stiffening ribs or gussets 73 are stamped from the inner sides of the channels 31a and the ends 28C, and serve to render the unit rigid. These ribs or gussets are disposed upon the outer face of the side 28C. While the box sides are shown and described as made of wood, this is not intended to form any necessary feature of the invention, as they may be made of any other suitable material, such as various non-metallic compositions, press board or even plastics, if desired. On the other hand, the handle member at the ends of the box is shown hollow in the form of a tube, which is, of course the preferred form, but a solid rod of smaller diameter but of the same tensile strength could be used. Such a rod is obviously too thin to form a convenient handle and is preferably built up to form a comfortable grip by having a tube or sleeve mounted thereon, which is even true of the inner tube shown in several of the views, although the sleeve in most cases is formed of the projecting upper portion of the metal ends of the box projecting out to the handle tube and surrounding the same as a sleeve.

It is to be understood that the forms of our invention herewith shown and described are to be taken as preferred examples of the same, and that various changes in the shape, size, and arrangements of parts may be resorted to, without departing from the spirit of our invention, or the scope of the subjoined claims.

Having thus described our invention, what we claim is:

1. A box for milk containers, cartons and the like, comprising box sides, a bottom, metal ends having opposite side edges bent outwardly within the inner sides of the end portions of the box sides, there being means for securing the side edges of the metal ends in contact with said end portions of said box sides, and a permanent reinforcing handle structure rigidly disposed at each end of said box, including an elongated handle member spaced a predetermined distance exteriorly of each metal end substantially parallel to the upper edge thereof and extending through the side edges of the respectively adjacent metal end and corresponding end portions of the box sides and terminating exteriorly of the latter in upset or riveted extremities, each metal end having the upper portion thereof bent outwardly toward the handle member respectively adjacent thereto and terminating as a sleeve mounted upon the handle member, with the ends of the sleeve in each case terminating against the side edges of the respectively adjacent metal end.

2. A box for milk containers, cartons and the like, comprising box sides, a bottom, and metal ends having inwardly facing upright channel members upon the end edges thereof, and means for reinforcing the ends of the box and clamping the channel portions upon the ends of the box sides, said means including an elongated handle member spaced a predetermined distance exteriorly of each metal end and extending through the channel members of the respectively adjacent metal end and the corresponding ends of the box sides engaged by said channel members and terminating upon the exterior portions of said channel members in riveted or upset extremities preventing the channel members upon each metal end from being forced apart and holding said exterior portions of said channel members against the exterior sides of the end portions of the box sides, and an outward extension upon the upper portion of each metal end bent toward the handle member and terminating as a sleeve mounted upon and surrounding said handle member, the sleeves upon the handle members extending to the channel members upon each of the metal ends and terminating against said channel members.

3. A rigid box for milk containers, cartons and the like, capable of resisting distortion and warping stresses, including the combination, with a pair of box sides, and metal ends having the opposite side edges thereof bent outwardly to form integral flanges within the inner sides of the end portions of the box sides, of a bottom having the ends thereof rigid with the lower portions of the metal ends, there being means for securing the integral flanges of the metal ends in contact with said end portions of said box sides, and a permanent upper reinforcing handle structure rigidly disposed at each end of the box, including an elongated handle member spaced a predetermined distance exteriorly of each metal end and extending through both of the integral flanges of the respectively adjacent metal end and corresponding end portions of the box sides and terminating exteriorly of the latter in upset or riveted extremities, and an extended top portion upon each metal end projecting outwardly between the integral flanges thereof toward, and rigidly connected to, the respectively adjacent handle member.

4. A rigid box for milk containers, cartons and the like, capable of resisting distortion and warping stresses, including the combination, with a pair of box sides, and metal ends having inwardly facing upright integral channel members at the opposite side edges which engage the end portions of the box sides, of a bottom having the ends thereof rigid with the lower portions of the metal ends, there being means for clamping the channel members upon said end portions of the box sides, and a permanent upper reinforcing handle structure rigidly disposed at each end of said box, including an elongated handle member spaced a predetermined distance exteriorly of each metal end and extending through both of the integral channel members of the respectively adjacent metal end and corresponding end portions of the box sides and terminating exteriorly of said channel members in upset or riveted extremities, and an extended top portion upon each metal end projecting outwardly between the integral channel members thereof toward, and rigidly connected to, the respectively adjacent handle member.

5. A rigid box according to claim 3, wherein the bottom has upwardly projecting flanges upon its longitudinal edges disposed exteriorly of and adjacent to the box sides.

6. A rigid box according to claim 4, wherein the bottom has upwardly projecting flanges upon its longitudinal edges disposed exteriorly of and adjacent to the box sides.

7. A box for milk containers, cartons and the like, comprising box sides, a bottom, metal ends having their opposite side edges provided with outwardly directed flanges within the inner sides of the end portions of the box sides, there being means for securing the flanges of the metal ends in contact with said end portions of said box sides, and a permanent reinforcing handle structure rigidly disposed at each end of the box, including an elongated handle member spaced a predetermined distance exteriorly of each metal end and extending through both of the outwardly directed flanges of the respectively adjacent metal end and the corresponding end portions of the box sides and terminating exteriorly of the latter in upset or riveted extremities, and an extended top portion upon each metal end projecting outwardly between the outwardly directed flanges thereof to the respectively adjacent handle member and terminating in contact with the latter.

8. A box for milk containers, cartons and the like, comprising box sides, a bottom, metal ends having inwardly facing upright channel members at the opposite side or end edges thereof which engage the end portions of the box sides, and a permanent reinforcing handle structure rigidly disposed at each end of the box and serving to clamp the channel members upon the end portions of said box sides, including an elongated handle member spaced a predetermined distance exteriorly of each metal end and extending through both of the channel members of the respectively adjacent metal end and corresponding end portions of said box sides and terminating exteriorly of the channel members in upset or riveted extremities, and an extended top portion upon each metal end projecting outwardly between the channel members thereof to the respectively adjacent handle member and terminating in contact with the latter.

9. A box for milk containers, cartons and the like, comprising box sides, a bottom, box ends connected to said sides within the extremities thereof, and a permanent reinforcing handle construction rigidly disposed at each end of the box, said handle construction including an elongated handle member spaced a predetermined distance exteriorly of each box end and connected rigidly at the ends thereof to the end portions of the box sides, and an extended top portion upon each box end projecting outwardly to the respectively adjacent handle member and being directly connected therewith.

10. A box for milk containers, cartons and the like, comprising box sides, a bottom, metal ends having opposite side edges bent outwardly within the inner sides of the end portions of the box sides, there being means for securing the side edges of the metal ends in contact with said end portions of said box sides, and a permanent reinforcing handle structure rigidly disposed at each end of said box, including an elongated handle member located exteriorly of each metal end substantially parallel to the upper edge thereof and extending through the side edges of the respectively adjacent metal end and corresponding end portions of the box sides and terminating exteriorly of the latter in upset or riveted extremities, each metal end having the upper portion thereof bent outwardly toward and about the handle member respectively adjacent thereto and terminating as a sleeve permanently mounted upon the handle member.

11. A box for milk containers, cartons and the like, comprising box sides, a bottom, and metal ends having inwardly facing upright channel members upon the end edges thereof, and means for reinforcing the ends of the box and clamping the channel portions upon the ends of the box sides, said means including an elongated handle member located exteriorly of each metal end and extending through the channel members of the respectively adjacent metal end and the corresponding ends of the box sides engaged by said channel members and terminating upon the exterior portions of said channel members in riveted or upset extremities preventing the channel members upon each metal end from being forced apart and holding said exterior portions of said channel members against the exterior sides of the end portions of the box sides, and each metal end having the upper portion thereof bent outwardly toward and about the handle member respectively adjacent thereto and terminating as a sleeve permanently mounted upon the handle member.

12. A rigid box for milk containers, cartons and the like, capable of resisting distortion and warping stresses, including the combination, with a pair of box sides, and metal ends having the opposite side edges thereof bent outwardly to form integral flanges within the inner sides of the end portions of the box sides, of a bottom having the ends thereof rigid with the lower portions of the metal ends, there being means for securing the integral flanges of the metal ends in contact with said end portions of said box sides, and a permanent upper reinforcing handle structure rigidly disposed at each end of the box and including an elongated handle member located exteriorly of each metal end and extending through both of the integral flanges of the respectively adjacent metal end and corresponding end portions of the box sides and terminating exteriorly of the latter in upset or riveted extremities, and an outwardly and downwardly extending top portion upon each metal end projecting exteriorly of the metal end involved between the integral flanges thereof toward, and rigidly connected to, the respectively adjacent handle member.

13. A rigid box for milk containers, cartons and the like, capable of resisting distortion and warping stresses, including the combination, with a pair of box sides, and metal ends having inwardly facing upright integral channel members at the opposite side edges thereof which engage the end portions of the box sides, of a bottom having the ends thereof rigid with the lower portions of the metal ends, there being means for clamping the channel members upon said end portions of the box sides, and a permanent upper reinforcing handle structure rigidly disposed at each end of the box and including an elongated handle member located exteriorly of each metal end and extending through both of the integral channel members of the respectively adjacent metal end and corresponding end portions of the box sides and terminating exteriorly of said channel members in upset or riveted extremities, and an outwardly and downwardly extending top portion upon each metal end projecting exteriorly of the latter between the integral channel members thereof toward, and rigidly connected to, the respectively adjacent handle member.

14. A box for milk containers, cartons and the like, comprising box sides, a bottom, metal ends having their opposite side edges bent outwardly to form integral flanges within the inner sides of the end portions of the box sides, there being means for securing the flanges of the metal ends in contact with said end portions of said box sides, and a permanent reinforcing handle structure rigidly disposed at each end of the box and including an elongated handle member located exteriorly of each metal end and extending through both of the integral flanges of the respectively adjacent metal end and the corresponding end portions of the box sides and terminating exteriorly of the latter in upset or riveted extremities, and an extended top portion upon each metal end projecting outwardly between the integral flanges thereof to and upon the respectively adjacent handle member and terminating in permanent contact with the latter.

15. A box for milk containers, cartons and the like, comprising box sides, a bottom, metal ends having inwardly facing upright channel members at the opposite side edges thereof which engage the box sides, and a permanent reinforcing handle structure rigidly disposed at each end of the box and serving to clamp the channel members upon the end portions of said box sides and including an elongated handle member located exteriorly of each metal end and extending through both of the channel members of the respectively adjacent metal end and corresponding end portions of said box sides and terminating exteriorly of the channel members in upset or riveted extremities, and an extended top portion upon each metal end projecting outwardly between the two channel members thereof to and upon the respectively adjacent handle member and terminating in permanent contact with the latter.

16. A box for milk containers, cartons and the like, comprising box sides, a bottom, box ends connected to said box sides, and a permanent reinforcing handle construction rigidly disposed at each end of the box, said handle construction including an elongated handle member disposed exteriorly of each box end and connected rigidly at the ends of said handle member to the end portions of the box sides, and an extended top portion upon each box end projecting outwardly over and upon the respectively adjacent handle member and being directly connected therewith.

17. A box for milk containers, cartons and the like, comprising box sides, a bottom, box ends connected to said box sides, and a permanent reinforcing handle construction located at each end of the box, said handle construction including an elongated handle member disposed exteriorly of each box end and connected rigidly at the extremities thereof to the end portions of the box sides, and an outwardly projecting top portion upon each box end extending to the respectively adjacent handle member and being directly and rigidly connected thereto.

18. A box for milk containers, cartons and the like, comprising box sides, a bottom, box ends connected to the box sides, and a permanent reinforcing handle construction located at each end of the box, said handle construction including an elongated handle member disposed exteriorly of each box end and connected rigidly at the extremities thereof to the end portions of the box sides, and a projecting top portion upon each box end extending outwardly and downwardly to the respectively adjacent handle member and being directly and rigidly connected thereto and at least partly enveloping the handle member in each case from above to form a sleeve thereon.

CHARLES W. PRAEGER.
HERMAN BLUM.
HERMAN JOCHIMSEN.

REFERENCES CITED

The following references are of record in the file of this patent:

UNITED STATES PATENTS

| Number | Name | Date |
|---|---|---|
| 249,915 | Fargo | Nov. 22, 1881 |
| 422,717 | Cladwell | Mar. 4, 1890 |
| 864,761 | Erickson | Aug. 27, 1907 |
| 1,980,545 | North | Nov. 13, 1934 |